(12) United States Patent
Kamble

(10) Patent No.: US 9,952,790 B2
(45) Date of Patent: Apr. 24, 2018

(54) APPLICATION SECURITY POLICY ACTIONS BASED ON SECURITY PROFILE EXCHANGE

(71) Applicant: Avocado Systems Inc., San Jose, CA (US)

(72) Inventor: Keshav Govind Kamble, San Jose, CA (US)

(73) Assignee: AVOCADO SYSTEMS INC., San Jose, CA (US)

( * ) Notice: Subject to any disclaimer, the term of this patent is extended or adjusted under 35 U.S.C. 154(b) by 124 days.

(21) Appl. No.: 15/181,304

(22) Filed: Jun. 13, 2016

(65) Prior Publication Data

US 2016/0364163 A1 Dec. 15, 2016

Related U.S. Application Data

(60) Provisional application No. 62/180,493, filed on Jun. 16, 2015, provisional application No. 62/175,324, (Continued)

(51) Int. Cl.
*G06F 3/06* (2006.01)
*G06F 21/00* (2013.01)
*H04L 29/08* (2006.01)
*G06F 21/55* (2013.01)
*G06F 21/60* (2013.01)
(Continued)

(52) U.S. Cl.
CPC ............ *G06F 3/0622* (2013.01); *G06F 3/067* (2013.01); *G06F 3/0637* (2013.01); *G06F 21/00* (2013.01); *G06F 21/556* (2013.01); *G06F 21/606* (2013.01); *G06F 21/6254* (2013.01); *H04L 67/2842* (2013.01); *G06F 12/0804* (2013.01); *G06F 12/1433* (2013.01); *G06F 2212/1052* (2013.01)

(58) Field of Classification Search
CPC ...... G06F 3/0622; G06F 3/0637; G06F 3/067; G06F 12/0804; G06F 12/1433; G06F 2212/1052; G06F 21/00; G06F 21/556; G06F 21/606; G06F 21/6254; H04L 67/2842
See application file for complete search history.

(56) References Cited

U.S. PATENT DOCUMENTS 7,895,642 B1 *  2/2011  Larson ................... H04L 63/20
                                                                  718/1
9,094,407 B1 *  7/2015  Matthieu ................ H04L 63/10
(Continued)

*Primary Examiner* — Hiep Nguyen
(74) *Attorney, Agent, or Firm* — Zilka-Kotab, P.C.

(57) ABSTRACT

In one embodiment, a method includes receiving, at a first host, a security profile related to a first data socket descriptor indicating risk to data security of a second host. The method also includes, in response to the risk indicated by the security profile, performing by the first host, at least one action selected from a group of actions. The group of actions includes a cache flush on a cache of the first host according to a cache flush policy, cache locking on data stored in the cache of the first host, data redaction on data of a payload prior to being sent by the first host, memory locking of data stored in an in-memory database of the first host, and encryption of data stored in the in-memory database of the first host or encryption of selected data fields of a payload prior to being sent from the first host.

20 Claims, 7 Drawing Sheets

Related U.S. Application Data filed on Jun. 14, 2015, provisional application No. 62/175,272, filed on Jun. 13, 2015, provisional application No. 62/175,273, filed on Jun. 13, 2015.

(51) Int. Cl.
*G06F 21/62* (2013.01)
*G06F 12/0804* (2016.01)
*G06F 12/14* (2006.01)

(56) References Cited

U.S. PATENT DOCUMENTS

| | | | |
|---|---|---|---|
| 9,742,768 B2* | 8/2017 | Cholas | H04L 63/10 |
| 2003/0140089 A1* | 7/2003 | Hines | H04L 29/06 709/202 |
| 2007/0028090 A1* | 2/2007 | Lopez | H04L 63/0428 713/153 |
| 2008/0115203 A1* | 5/2008 | Elzur | H04L 63/08 726/12 |
| 2010/0037295 A1* | 2/2010 | Oh | G06F 21/57 726/3 |
| 2011/0302624 A1* | 12/2011 | Chen | G06Q 20/10 726/1 |
| 2012/0173875 A1* | 7/2012 | Mahidhara | H04W 4/008 713/168 |
| 2015/0134965 A1* | 5/2015 | Morenius | G06F 21/57 713/172 |
| 2016/0308904 A1* | 10/2016 | Yoon | H04L 63/20 |

* cited by examiner

FIG. 5

| Policy Name | Source IP | Dest IP (Optional) | Server Port | ID1 | ID2 | Security Profile Range | MTU | App. Buffer Size | Action | Sub-Action | Server Group |
|---|---|---|---|---|---|---|---|---|---|---|---|
| 502 | 504 | 506 | 508 | 510 | 512 | 514 | 516 | 518 | 520 | 522 | 524 |

| Policy Name | Source IP | Dest IP (Optional) | Server Port | ID1 | ID2 | Base Signature | MTU | App. Buffer Size | Action | Sub-Action | Server Group |
|---|---|---|---|---|---|---|---|---|---|---|---|
| 502 | 504 | 506 | 508 | 510 | 512 | 602 | 516 | 518 | 604 | 606 | 524 |

(600)

APPLICATION SECURITY POLICY ACTIONS BASED ON SECURITY PROFILE EXCHANGE

FIELD OF THE INVENTION

The present invention relates to network and system protection, and more particularly, this invention relates to applying an action policy in response to a security profile exchange.

BACKGROUND

Applications are made up of a large number of instructions and data. Instructions operate on data which is fetched in a cache and memory and is always unencrypted. Scaled-out, distributed applications are made up of a large number of application instances. These application instances have their own data in the cache and memory of the processor on which these applications run. A large number of such application instances communicate with each other and process data in parallel to create an aggregate output.

These types of scaled-out applications are extremely vulnerable to application breaches, data thefts from cache and memory by scraping, and other methods of illicitly obtaining data from the applications, cache, and/or memory. In data centers which cater to important applications and data types, such as Personally Identifiable Information (PII), Payment Card Industry (PCI) data, medical information that falls under Health Insurance Portability and Accountability Act (HIPAA), military and Government critical tasks, any application and/or data breach is very destructive and expensive to contain and/or resolve. Therefore, it is beneficial to attempt to prevent such breaches.

SUMMARY

In one embodiment, a method includes receiving, at a first host, a security profile related to a first data socket descriptor indicating risk to data security of a second host. The method also includes, in response to the risk indicated by the security profile, performing by the first host, at least one action selected from a group of actions. The group of actions includes a cache flush on a cache of the first host according to a cache flush policy, cache locking on first data stored in the cache of the first host according to a cache locking policy, data redaction on second data of a first payload prior to being sent by the first host according to a redaction policy, memory locking of third data stored in an in-memory database of the first host according to a memory locking policy, and encryption of fourth data stored in the in-memory database of the first host or encryption of selected data fields of a second payload prior to being sent from the first host.

According to another embodiment, a system includes a processing circuit and logic integrated with and/or executable by the processing circuit. The logic is configured to cause the processing circuit to receive, at a first host, a security profile related to a first data socket descriptor indicating risk to data security of a second host. The logic is also configured to cause the processing circuit to perform, by the first host, at least one action selected from a group of actions in response to the risk indicated by the security profile. The group of actions includes a cache flush on a cache of the first host according to a cache flush policy, cache locking on first data stored in the cache of the first host according to a cache locking policy, data redaction on second data of a first payload prior to being sent by the first host according to a redaction policy, memory locking of third data stored in an in-memory database of the first host according to a memory locking policy, and encryption of fourth data stored in the in-memory database of the first host or encryption of selected data fields of a second payload prior to being sent from the first host.

In yet another embodiment, a computer program product includes a computer readable storage medium having program instructions stored thereon. The program instructions are executable by a processing circuit to cause the processing circuit to receive, at a first host, a security profile related to a first data socket descriptor indicating risk to data security of a second host. The program instructions are also executable by a processing circuit to cause the processing circuit to perform, by the first host, at least one action selected from a group of actions in response to the risk indicated by the security profile. The group of actions includes a cache flush on a cache of the first host according to a cache flush policy, cache locking on first data stored in the cache of the first host according to a cache locking policy, data redaction on second data of a first payload prior to being sent by the first host according to a redaction policy, memory locking of third data stored in an in-memory database of the first host according to a memory locking policy, and encryption of fourth data stored in the in-memory database of the first host or encryption of selected data fields of a second payload prior to being sent from the first host.

The embodiments described above may be implemented in any computing system environment known in the art, such as a networking environment, which may include a processor and a computer readable storage medium configured to store data and logic, the logic being implemented with and/or executable by the processor to cause the processor to perform one or more functions.

BRIEF DESCRIPTION OF THE DRAWINGS

The following descriptions of the drawings are not meant to be limiting on what is taught by the drawings in any manner. For a fuller understanding of the content of each drawing, the following brief descriptions are provided, which when read in conjunction with the detailed description, describe the full breadth of the various embodiments of the present invention.

FIG. 5 shows a security profile policy mapping, according to one embodiment.

FIG. 6 shows an East-West policy mapping, according to one embodiment.

DETAILED DESCRIPTION

Figure 1:
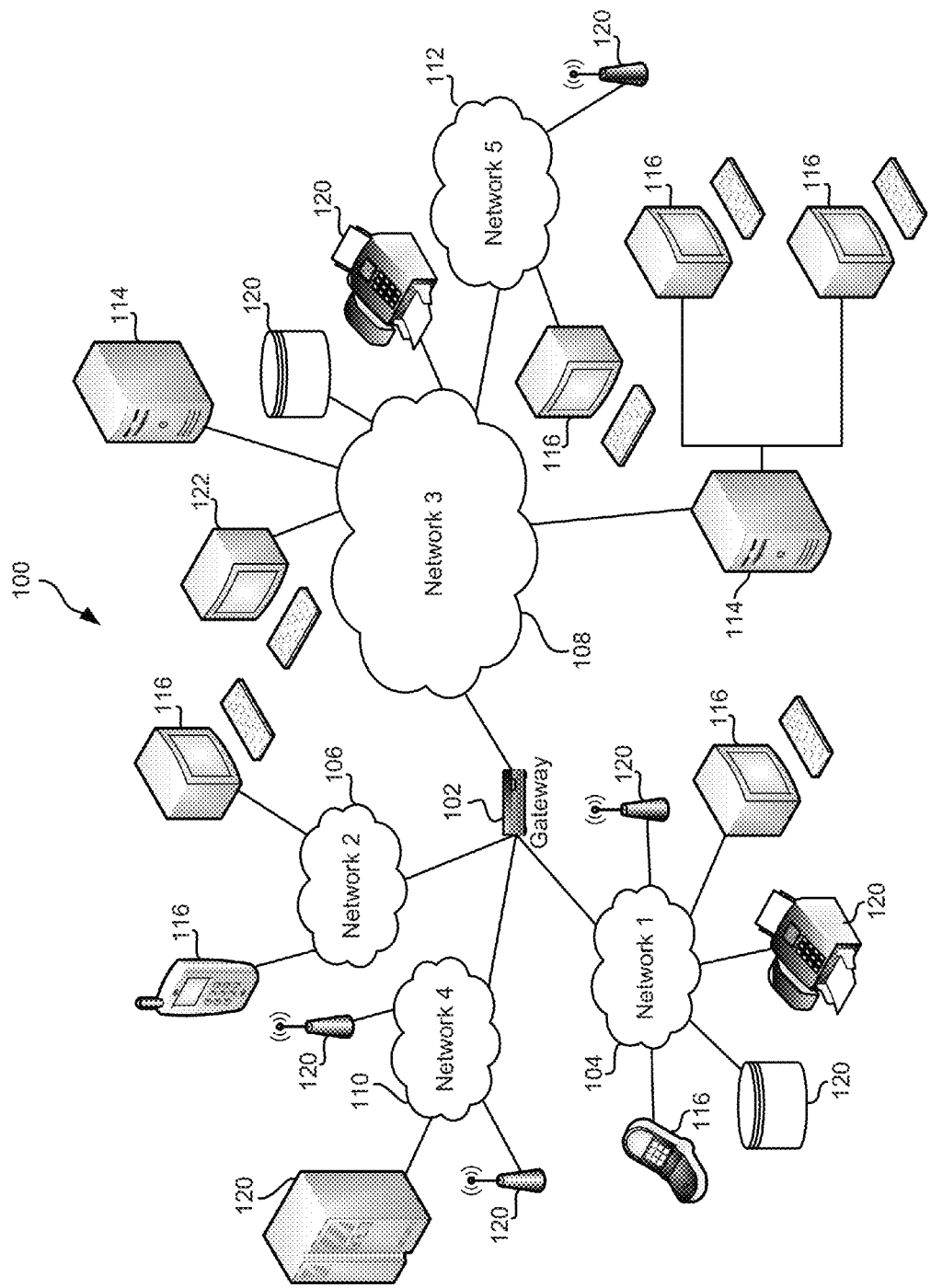
FIG. 1 shows a network architecture, according to one embodiment.

The descriptions presented herein are intended to enable any person skilled in the art to make and use the present invention and are provided in the context and requirements of particular applications of the present invention.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an," and "the" include plural referents unless otherwise specified.

Moreover, the term "about" when used herein to modify a value indicates a range that includes the value and less and greater than the value within a reasonable range. In the absence of any other indication, this reasonable range is plus and minus 10% of the value. For example, "about 10 milliseconds" indicates 10 ms±1 ms, such that the range includes all values in a range including 9 ms up to and including 11 ms.

Also, the term "comprise" indicates an inclusive list of those elements specifically described without exclusion of any other elements. For example, "a list comprises red and green" indicates that the list includes, but is not limited to, red and green. Therefore, the list may also include other colors not specifically described.

Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown and described herein, but is to be accorded the widest scope consistent with the principles and features disclosed herein.

In particular, various embodiments of the invention discussed herein may be implemented using a network, such as the Internet, to communicate among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN), or other communication media. In addition, various combinations of wired (e.g., Ethernet), wireless (e.g., radio frequency) and optical communication links (e.g., fiber optic) may be utilized.

The term application as used herein refers to any type of software and/or hardware-based application, such as enterprise data center applications, Internet-of-Things (IOT) applications, Industrial control applications, military applications, etc.

Enterprise data center applications may include any of the following application types: financial applications, equity trading applications, healthcare applications, financial transaction applications, etc.

IOT applications may include any of the following application types: mobile communication applications, home automation/control applications, industrial automation/control applications, security and monitoring applications, etc.

Industrial control applications may include any of the following application types: nuclear power plant control, thermal power plant control, hydro-electric power plant control, wind farm control, electricity grid and distribution control, water treatment control, land-based traffic control, air traffic control, etc.

Military applications may include any of the following application types: military installation control, first alert system control, autoguided weapon system control, military weaponized equipment control including manned vehicles, weaponized and/or surveillance-oriented unmanned vehicle control (drones) such as unmanned aerial vehicles (UAVs), unmanned aircraft systems (UASs), unmanned underwater vehicles (UUVs), unmanned ground vehicles (UGVs), etc.

A program environment in which one embodiment may be executed illustratively incorporates one or more general-purpose computers and/or special-purpose devices, such as switches, routers, switch controllers, etc. Details of such devices (e.g., processor, memory, data storage, input devices, and output devices) are well known and are omitted for the sake of clarity.

It should also be understood that the techniques of the present invention may be implemented using a variety of technologies. For example, the methods described herein may be implemented in software running on a computer system, implemented in hardware utilizing one or more hardware processors and logic (hardware logic and/or software logic) implemented with and/or executable by the hardware processor. The logic is configured to cause the processor to perform operations of a method, and may take any form known to those of skill in the art, such as application specific integrated circuits (ASICs), programmable logic devices such as Field Programmable Gate Arrays (FPGAs), and/or various combinations thereof.

In one illustrative approach, methods described herein may be implemented by a series of computer-executable instructions stored to a computer readable storage medium, such as a physical (e.g., non-transitory) data storage medium. In addition, although specific embodiments may employ object-oriented software programming concepts, the present invention is not so limited and is adaptable to employ other forms of directing the operation of a processor.

The present invention may also be provided in the form of a computer program product comprising a computer readable storage medium having program instructions thereon or a computer readable signal medium having program instructions therein, which may be executed by a computing device (e.g., a processor) and/or a system. A computer readable storage medium may include any medium capable of storing program instructions thereon for use by a computing device or system, including optical media such as read only and writeable CDs and DVDs, magnetic memory or media (e.g., hard disk drive, magnetic tape, etc.), semiconductor memory (e.g., FLASH memory, non-volatile random access memory (NVRAM), and other non-volatile storage media known in the art), firmware encoded in a microprocessor, etc.

A computer readable signal medium is one that does not fit within the aforementioned computer readable storage medium definitions. For example, illustrative computer readable signal media communicate or otherwise transfer transitory signals within a system, between systems, etc., e.g., via a physical or virtual network having a plurality of connections.

FIG. 1 illustrates an architecture 100, in accordance with one embodiment. As an option, the present architecture 100 may be implemented in conjunction with features from any other embodiment listed herein, such as those described with reference to the other figures. Of course, however, such architecture 100 and others presented herein may be used in various applications and/or in permutations which may or may not be specifically described in the illustrative embodiments listed herein. Further, the architecture 100 presented herein may be used in any desired environment.

As shown in FIG. 1, a plurality of remote networks are provided including a first remote network 104 and a second remote network 106. A gateway 102 may be coupled between the remote networks 104, 106 and a proximate network 108. In the context of the present network architecture 100, the networks 104, 106 may each take any form including, but not limited to, a LAN, a WAN such as the Internet, a storage area network (SAN), a public switched telephone network (PSTN), an internal telephone network, etc. Additional networks 110, 112 may also be connected via the gateway 102 or some other connection device known in the art. These networks may be of a different type than the networks 104, 106. For example, network 110 may be a network devoted to the IOT, and may provide infrastructure and protocols for communication between all devices in the IOT, and between any devices in the IOT and the networks 104, 106. In another example, network 112 may be a network devoted to Industrial control, and may provide infrastructure and protocols for communication within and/ or between facilities anywhere in the world, including automated devices, manufacturing lines, assembly lines, processing control software, etc.

In use, the gateway 102 serves as an entrance point from the remote networks 104, 106 to the proximate network 108. As such, the gateway 102 may function as a router, which is capable of directing a given packet of data that arrives at the gateway 102, and a switch, which furnishes the actual path in and out of the gateway 102 for a given packet.

Further included in the network architecture 100 is at least one data server 114 coupled to the proximate network 108, and which is accessible from the remote networks 104, 106 via the gateway 102. It should be noted that the data server(s) 114 may include any type of computing device/ groupware. Coupled to each data server 114 is a plurality of user devices 116. User devices 116 may include any device known by those of skill in the art, such as a desktop computer, a laptop computer, a hand-held computer, a smartphone, a terminal, a port, a printer, some type or form of logic, etc. It should be noted that a user device 122 may also be directly coupled to any of the networks, in one embodiment.

A peripheral 120 or series of peripherals 120, e.g., facsimile machines, printers, networked storage units, hard disk drives, wireless routers, etc., may be coupled to one or more of the networks 104, 106, 108, 110, 112. It should be noted that databases, servers, mainframes, and/or additional components may be utilized with and/or integrated into any type of network element coupled to the networks 104, 106, 108, 110, 112. In the context of the present descriptions, a network element may refer to any component of a network, system, device, and/or any device useable in a network.

According to some approaches, methods and systems described herein may be implemented with and/or utilized on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of virtualization software, such as VMWARE ESX, MICROSOFT HYPER-V, SIMICS, etc., in some embodiments.

In more approaches, one or more of the networks 104, 106, 108, 110, 112 may represent a cluster of systems commonly referred to as a "cloud." In cloud computing, shared resources, such as processing power, peripherals, software, data processing, servers, storage, etc., are provided to any system that has access to the cloud and permission to access the specific resource, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used as would be understood by those of skill in the art.

Figure 2:
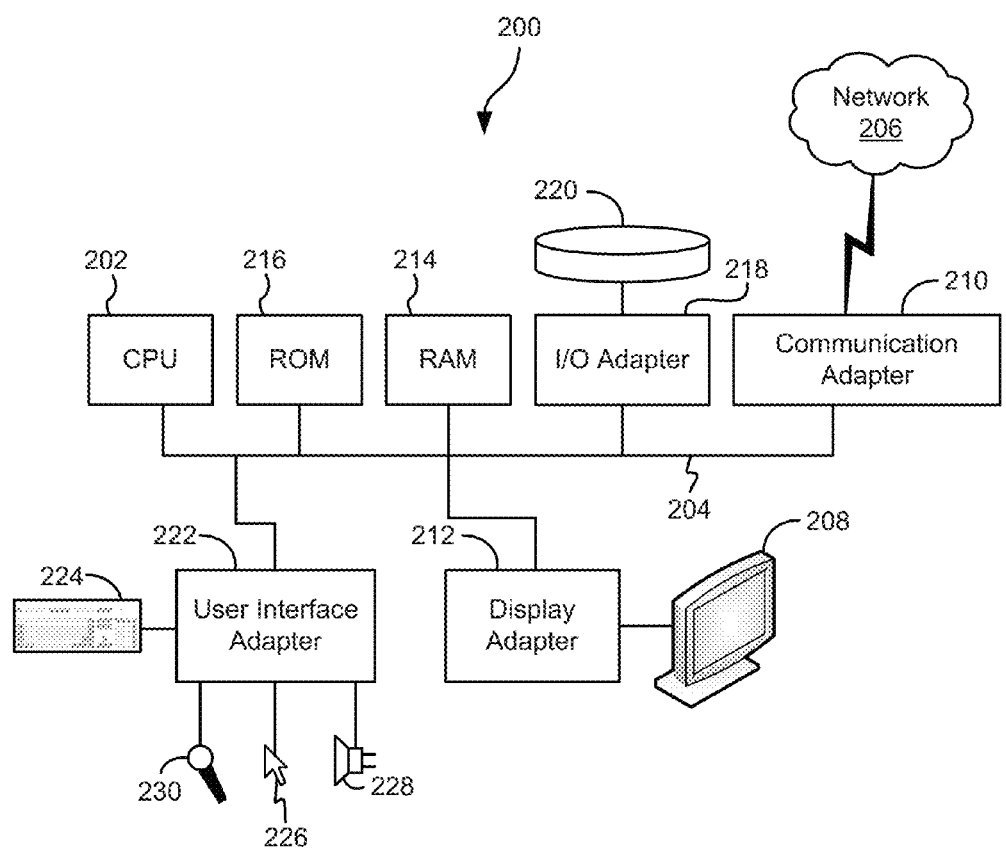
FIG. 2 shows a hardware environment that may be associated with the network architecture of FIG. 1, according to one embodiment.

FIG. 2 shows a representative hardware environment associated with a user device 116 and/or a server 114 of FIG. 1, in accordance with one embodiment. FIG. 2 illustrates a typical hardware configuration of a workstation 200 having a central processing unit 202, such as a microprocessor, and a number of other units interconnected via a system bus 204.

The workstation 200 shown in FIG. 2 includes a Random Access Memory (RAM) 214, Read Only Memory (ROM) 216, an I/O adapter 218 configured to connect peripheral devices, such as disk storage units 220 to the bus 204, a user interface adapter 222 configured to connect a keyboard 224, a mouse 226, a speaker 228, a microphone 230, and/or other user interface devices such as a touch screen, a digital camera, etc., (not shown) to the bus 204, communication adapter 210 configured to connect the workstation 200 to a communication network 206 (e.g., a data processing network) and a display adapter 212 configured to connect the bus 204 to a display device 208.

The workstation 200 may have resident thereon an operating system, such as the MICROSOFT WINDOWS Operating System (OS), a MAC OS, a UNIX OS, etc. It will be appreciated that a preferred embodiment may also be implemented on platforms and operating systems other than those specifically mentioned herein. A preferred embodiment may be written using JAVA, XML, C, and/or C++ language, SCALA, COBOL, FORTRAN, or other programming languages, along with an object oriented programming methodology or scripting language such as PERL, PYTHON, Tcl/Tk, or other scripting languages. Object oriented programming (OOP), which has become increasingly used to develop complex applications, may also be used.

Moreover, one or more hardware processors may be implemented in a processing circuit in the workstation 200. The processing circuit includes the one or more hardware processors, along with any connections or links therebetween necessary to interconnect the one or more processors in the processing circuit. In addition, the processing circuit may be implemented with logic and/or may be configured to execute logic, with the logic being configured to cause the processing circuit to perform functionality specified by the logic.

Figure 3:
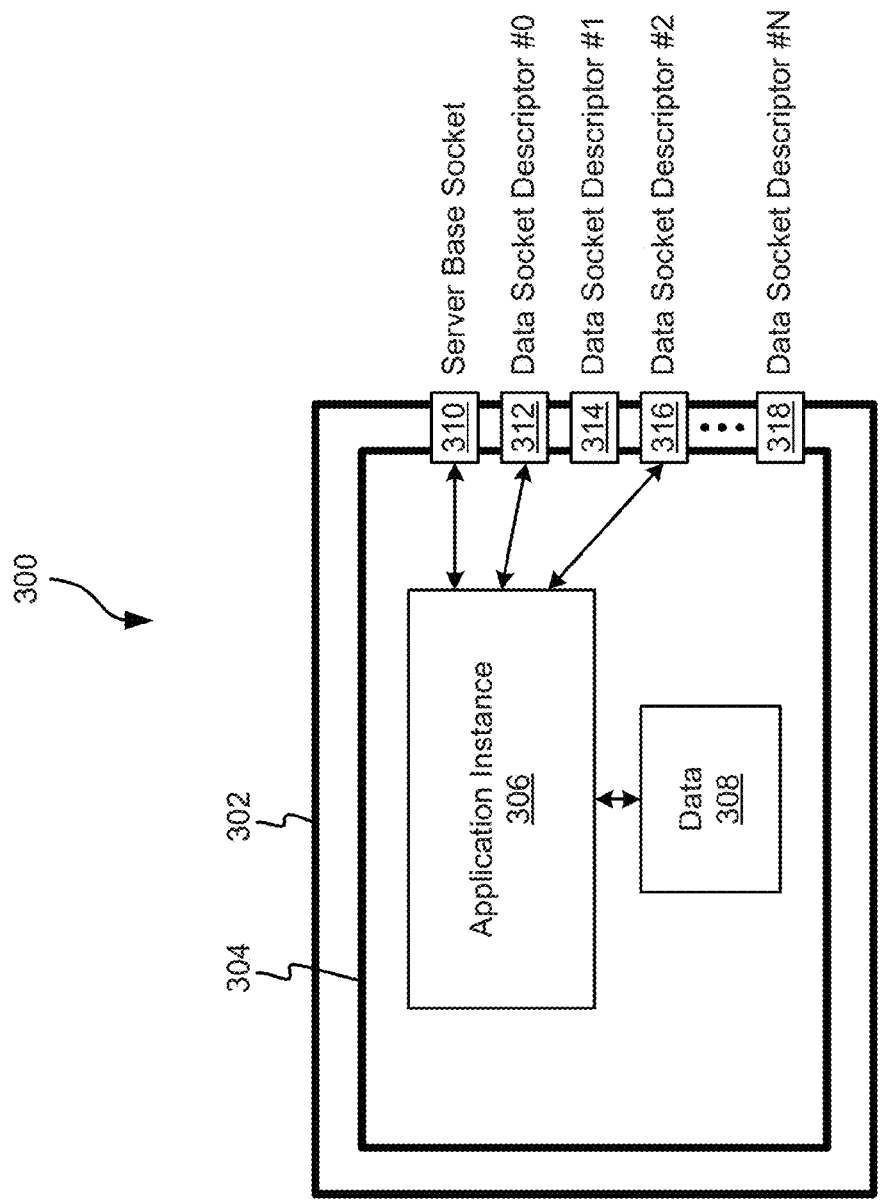
FIG. 3 shows a logical representation of an application instance operating on a computing system, in accordance with one embodiment.

Now referring to FIG. 3, a logical representation of an application instance 306 operating on a computing system 300 is shown according to one embodiment. Although only one application instance 306 and one set of data 308 is shown in FIG. 3, as would be understood by one of skill in the art, any number of application instances and groups of data may be hosted on a computing system 300, limited only by the processing power and/or other resources available to the computing system 300.

As shown in FIG. 3, an application protection layer (APL) 302 and a data protection layer (DPL) 304 are represented within the computing system 300, according to one embodiment. The application instance 306 has access to data 308 within the computing system 300. Also, the application instance 306, through any number of standard and/or custom APIs, may utilize any of a plurality of data socket descriptors (e.g., data socket descriptor #0 312, data socket descriptor #1 314, data socket descriptor #2 316, . . . , data socket descriptor #N 318) with which to communicate (send and/or receive) information outside of the application instance 306 or computing system 300. One or more server base sockets 310 is provided in the application instance 306 of computing system 300 and is used for control of the peer application instances on the computing system 300, outside the system, or outside the application instance 306 itself, as would be understood by one of skill in the art.

In order to provide application and data protection to application instances of distributed, scaled-out applications which have instances operating on a plurality of computing systems, at least two operations may be performed, and are described below according to one embodiment.

In a first operation, application instances, such as application instance 306, are identified based upon data socket descriptor attributes that an application instance uses to communicate between other application instances and/or group(s) of application instances on/or outside of the computing system 300. For example, in response to application instance 306 utilizing data socket descriptor #0 312 consistently to communicate with another system, an association may be established between data socket descriptor #0 312 and the application instance 306. By consistently, what is meant is that application instance 306 utilizes data socket descriptor #0 312 to communicate with another system more than a predetermined number of times within a given period of time, according to one embodiment. In another embodiment, consistently utilizing a data socket descriptor means that only a specific data socket descriptor is used in exclusion of all others over a given period of time.

In a second operation, a group is formed which includes any application instance which has all of the same socket descriptor attributes (or at least a predetermined amount of the same socket descriptor attributes, or the same of a certain group of socket descriptor attributes), e.g., data exchange sockets of the same application base socket, transport protocol, server port, various multi-tenancy characteristics, storage characteristics, payload sizes, container attributes, and/or multiple time contexts are grouped together.

Any socket descriptor attributes may be considered when determining whether an application instance shares data socket descriptor attributes with another application instance, such as OS and container attributes which include server port, transport protocol, network address translation (NAT) IP address range, maximum transmission unit (MTU), application payload sizes, user programmable attributes such as multi-tenancy labels etc.

Using the above two operations, two layers of protection (application protection and data protection) are enacted together to protect the application (not shown) from which the application instance 306 is provided and any group of application instances related to the application that provides the application instance 306.

FIG. 3 shows the Application and Data Protection Layer (ADPL) libraries which keep track of the server base socket 310 and various data socket descriptors 312, 314, 316, . . . , 318 opened by an application instance 306 for communication of data with one or more peer applications outside of the computing system 300. The data socket descriptors 312, 314, 316, . . . , 318 are used for the exchange of data with another system outside of the computing system 300.

The data socket descriptors 312, 314, 316, . . . , 318 are numbers that represent attributes and/or characteristics of different data exchanges between the application instance and one or more receiver hosts. Each data socket descriptors 312, 314, 316, . . . , 318 may have a size ranging from 12 to 48 bits, such as 32 bits in one embodiment.

Each of the Application Protection Layer (APL) 302 and the Data Protection Layer (DPL) 304 utilize individual sets of application programming interfaces (APIs) that are configured to piggyback on existing APIs, but add specialized functionality to any action performed using the existing APIs.

These new socket APIs and data protection APIs, and the type of application payload sent and received, do not disturb the intermediate security appliances such as firewall, Intrusion Prevention and Intrusion Detection, etc.

The application instance 306 utilizes the one or more server base socket(s) 310 with standard and/or private well-known port number(s) as a control socket, but opens a new data socket descriptor and allocates a different port number to the new data socket descriptor in order to handle actual functionality and data transfer between the computing system 300 and any other external or peer system.

The server base socket 310 has the following attributes and/or characteristics:
1. A server and/or a source internet protocol (IP) interface.
2. A standard and/or known server port number, e.g., transmission control protocol (TCP) port, user datagram protocol (UDP) port, etc.
3. A maximum number of allowable waiting connections.
4. A maximum (and possibly minimum) application packet buffer size usable for transmitting and receiving data.
5. Other socket options provided by the operating system, the user, or an external input.

The above described attributes and/or characteristics may also be attributed to the plurality of allocated data socket descriptors 312, 314, 316, . . . , 318. When a connection is established between the computing system 300 and another system via the application instance 306, a data socket descriptor is allocated. The allocated data socket descriptor has the following attributes and/or characteristics:
1. A server and/or a source IP interface.
2. A standard and/or known server port number, e.g., TCP port, UDP port, etc.
3. A maximum number of allowable waiting connections.
4. Application packet buffer size for transmit and receive.
5. A port number of the transport of the allocated data socket descriptor (in the computing system 300).
6. An IP address of the peer data socket descriptor (in an external system) of the allocated data socket descriptor (usually, but not always, in TCP sockets).
7. A port number of the transport of the peer data socket descriptor of the allocated data socket descriptor in all cases of controlled port allocations by the application instance 306.
8. A maximum (and possibly minimum) application packet buffer size usable for transmitting data to and receiving data from (transmissions with) the peer data socket descriptor.

Apart from the above described characteristics and/or attributes, additional characteristics that may be attributable to an allocated data socket descriptor include:
9. A first identifier (ID1): a globally unique identification number given for an entity (such as an enterprise, company, university, city subdivision, etc.) that utilizes the ADPL mechanism in the application instances or programmed for proprietary purposes 10. A second ID (ID2): a unique identification number within the entity (not necessarily globally unique). Each ID2 represents a subdivision within the entity, such as an individual business unit within an enterprise, a water district within a city, etc., or programmed for proprietary purposes.
11. Secure base signature: a base signature or scrambled alphanumeric or numerical code used in the generation of signatures per data socket descriptor.
12. Secure runtime signature: a scrambled alphanumeric or numerical code used as a signature on a per data socket descriptor basis.
13. Application name: a name given to the application instance operating on the computing system.
14. Application ID: an identification number provided to the application instance operating on the computing system.
15. Process ID: an identification number provided to a particular process which is accountable for the data.
16. Server port: the particular port on the server on which data is received or sent.
17. Transport protocol: the particular transport protocol used to send data.
18. Base Crypto Version: the version of the cryptographic process used to encrypt data.
19. Co-Lo Need: Co-locationing criterions where applications or application instances may reside together in the same server, server pool, rack, pod, or data center.
20. Architecture Tier: a tier within the system architecture on which the (web, application, database, etc.) operates.
21. Storage Attachments: an attribute that describes how the storage is attached to the computing system (e.g., direct, network, distributed, etc.)
22. Proprietary Multi-Tenant Label: a label within the ADPL tag which designates some information selectable by the user.

These unique attributes when combined together in one of many different variations, are able to identify a data socket descriptor, and locks that data socket descriptor to one particular instance of a scaled-out application group.

Highly scaled-out and distributed enterprise applications typically run on physical servers with about 2 TB of DRAM and 32 MB of cache, or more. When access to a database is requested, the whole database in un-encrypted form is fetched into the memory (in-memory) and held in clear-text for processing. This mechanism is referred to as "in-memory database." In-memory database processing provides a performance boost of almost 200 times over conventional processing which relies on fetching database records from disk storage to memory. In-memory database processing also involves processing whole rows or columns of data in cache. Although, these types of enterprise application architectures provide very high performance and scalability, they suffer from application and data security challenges. These applications exchange huge amounts of data in an East-West (E-W) manner with instances of the application. A huge amount of E-W communication and a huge amount of data in memory and cache causes these application instances to be prime targets for data breaches and/or application breaches.

Usually, application security is attempted by applying policies and rules at various levels in security appliances and/or load balancing appliances in data centers. However, in spite of providing layers of security appliances to create a security perimeter, polymorphic malware and malicious software is able to enter inside the servers in the data center to steal data and attack applications. Enterprise database applications for financial companies, such as banks, insurance companies, and credit card companies, are extremely vulnerable to data theft by various methods and various types of attacks, including spoofing, cache scraping, memory scraping, etc. Spoofing occurs when malicious code mimics real application transmission in order to obtain data that it is not authorized to obtain. Cache scraping occurs when malicious code searches the cache for data that may be sensitive in nature and copies the data or strips some or all of the data from the cache so that it may be utilized by inappropriate entities. Memory scraping is similar, except that the memory may hold large amounts of application data as well as the in-memory database which receives attacks for data stored therein.

Many databases provide features that may be used to address these forms of attack. One such feature, referred to as run-time results-cache flush, is used to flush the cache (e.g., discard all data in the cache) according to some static schedule or in response to performance issues. One problem with this approach is that the cache flush is performed, typically, to achieve performance enhancements instead of protecting data. A cache flush may be performed in this approach at times when new data needs to be processed by fetching it from the memory.

Another feature is data redaction, in which sensitive data may be redacted and/or masked from transmissions according to a static policy, which typically indicates that all data that conforms to a certain type is redacted from transmissions. One problem with this approach is that the redaction policies are statically applied depending upon the access levels of the client who is seeking the data and do not redact data if the query owner has administrative credentials.

Yet another feature is locking of in-memory database(s). In this feature, an entire database table is locked, or specific row(s) or column(s) of the database table are locked. The database locking may be programmatically applied to avoid un-authorized access to the database(s). The problem with the current implementation of this feature is that the database locking is typically performed according to some static policy. Most of the times, the in-memory database(s) are locked without understanding the security situation in which the application(s) must deal with. A vast majority of the time, the database locking mechanism is not used at all since it creates functional and performance issues, and therefore is not a preferred approach in current implementations.

With scaled-out database applications, clustered databases, and/or distributed database applications, the application servers or database servers are scattered all over the data center. Huge amounts of data is exchanged between these application instances over the networks, which are intended to be highly protected from outside entities. However, in reality, most of the datacenter breaches occur from within the datacenter. The various application instances operating within the datacenter are not aware of their surroundings, not aware of a security status of the physical servers they are running on, and not aware of the security status of peer application instances they are sharing data with. The security status refers to a security profile or malware infection level of the hosts. Almost all of the datacenter applications share data with each other without knowing the security profiles of each other, thereby leading to data breaches or data stealing by malware and malicious code using server application vulnerabilities.

Therefore, according to embodiments described herein, application data may be secured via one or more security features described herein depending upon the dynamic security profiling of the surroundings of the application instance on a per-data socket descriptor basis.

In one embodiment described herein, a cache holding sensitive information, such as Personally Identifiable Information (PII), Payment Card Industry (PCI) data, Health Insurance Portability and Accountability Act (HIPAA) sensitive data, business-critical data, or some other data for which it is undesirable for unauthorized entities to obtain, may be programmatically and dynamically flushed to avoid cache scraping or stealing data from cache using already existing application architecture, along with the ADPL. Business-critical data may comprise any data that is deemed to be important by an administrator, such as trade secrets, proprietary algorithms and formulae, details of secret projects, names of hidden employees, etc.

In accordance with another embodiment, PII, PCI, HIPAA sensitive data, business-critical data, and other sensitive information may be redacted and/or masked prior to sending out a payload via data socket descriptor-based dynamic policies. The redaction may be performed in full, partially, via regular expression, or via random expression, as will be described in more detail herein.

In accordance with yet another embodiment, PII, PCI, HIPAA sensitive data, business-critical data, and other sensitive information may be protected using dynamic locking of in-memory database(s). In this feature, one or more in-memory database tables is locked, or specific row(s) and/or column(s) of at least one of the database tables are locked, in response to a threat or risk ascertained according to a received security profile.

According to another embodiment, PII, PCI, HIPAA sensitive data, business-critical data, and other sensitive information may be protected using dynamic payload encryption, in which some or all of a payload in a transmission via a data socket descriptor may be dynamically encrypted based on a threat or risk ascertained by security profile exchange between the application instances using the data socket. In another embodiment, certain data within one or more in-memory database tables may be encrypted using any known encryption techniques known in the art.

With these new approaches, application instances operating on hosts or servers are provided the tools to protect themselves and their own data from malware attacks, scraping, spoofing, etc. This method works by overloading standard and/or proprietary APIs including socket APIs and/or libraries and provides protection to application instances and their data. Furthermore, the approach does not interfere with the application architecture and its normal behavior. Through these new APIs, application instances are provided extra capabilities to get additional infrastructural help to know the security status of virtual and/or physical servers running the application instances, the security status of other peer applications and their virtual and/or physical servers, details of types of attacks that have occurred on the peer application instances, a number of times each of the peer application instance have thwarted breach attempts, etc. Based on the comprehensive status of servers and the network, the APIs provide feedback on a per-socket descriptor basis to the application instances. Moreover, the APIs may suggest the use of specific data protection mechanisms to protect clear data being exchanged with peers or clients.

Figure 4:
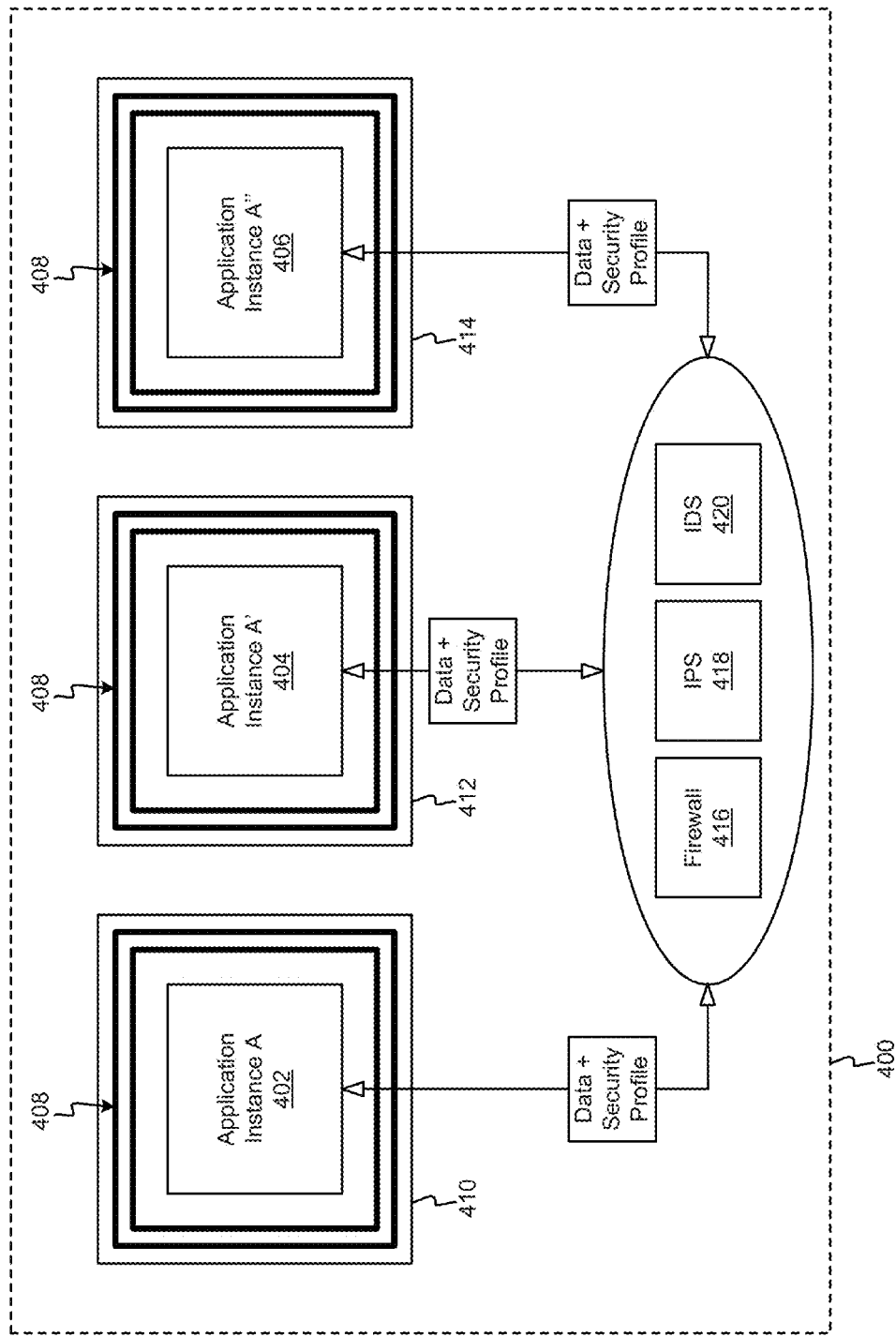
FIG. 4 shows several application instances operating in a virtual environment, according to one embodiment.

Now referring to FIG. 4, three instances of an application, Application instance A 402, Application instance A' 404, and Application instance A" 406 are shown running in a virtual environment 400 on one or more virtual platforms, such as hypervisors. An APDL 408 provided by secure APIs called by the hosts, Host A 410, Host A' 412, and Host A" 414, enables application protection via policies and also provides data protection by sharing a security status and security profile with any peer application instances operating on other hosts (Application instance A 402 is a peer to Application instance A' 404, Application instance A' 404 is a peer to Application instance A" 406, Application instance A" 406 is a peer to Application instance A 402, and so forth). Using the security profile of the peer application instance, the protected application instance is provided the capability to apply various data security mechanisms to protect itself from malicious code and data breach attacks.

New socket APIs and data protection APIs that are utilized to provide the protection do not disturb any intermediate security appliances used in the network and/or on the servers or hosts, such as a firewall 416, an Intrusion Prevention System (IPS) 418, an Intrusion Detection System (IDS) 420, etc.

The ADPL 408 around the socket descriptors for database applications creates a mapping of security profile policies with the application per data socket descriptor to perform various security feature functionality, such as dynamic cache flush, dynamic data redaction, locking of in-memory database(s), etc. These security features are configured to be applied on a per application instance per session basis. As a result, a database server is allowed to enact a dynamic security feature depending upon the security profile of that particular session at that time, thereby avoiding cache scraping, data breaches, or other unwanted intrusion by malware or nefarious applications.

FIG. 5 shows a security profile policy mapping 500 that may be used by a dynamic security feature mechanism according to one embodiment. The fields included in the mapping 500 include, but are not limited to, policy name 502, which indicates the name of the data security policy; source IP 504, which indicates the source of the interaction, e.g., the peer server IP address of the socket descriptor (per socket descriptor); destination IP 506, an optional field which indicates the IP address of the recipient; server port 508, which indicates the particular port on the server on which data is received or sent, e.g., application base port; ID1 510, which indicates a globally unique identification number given by the library mechanism for an entity (such as an enterprise, company, university, city subdivision, etc.) that utilizes the ADPL mechanism in the application instances or programmed for proprietary purposes; ID2 512, which indicates a unique identification number within the entity (not necessarily globally unique) given by the library mechanism; security profile range 514, which indicates a determined risk range associated with the security profile which is done by creating groups of security profiles based on their absolute values and then selecting a group using operations like 'less than,' 'greater than,' or 'equal to'; MTU 516, which indicates a Maximum Transfer Unit of physical media; App. Buffer Size 518, which indicates a size of the buffer the application instance uses to send or receive data over this socket descriptor; action 520 which indicates one or more of a plurality of actions that may be performed, such as dynamic cache flush, data redaction, cache locking, in-memory locking, etc.; sub-action 522, which indicates a further action that may be performed in addition to the action, such as logging which logs the details of the action taken with information in log files, traps which send indication to a remote monitor or controller entity with information about the action, triggering an event which forms an event with all associated information and sends it for further processing by external controller entities, mirroring which performs a dynamic, real-time action of capturing the payload or the flow and sending it as is, out to other external analytical or processing devices for deeper analysis and processing, etc.; and server group 524, which indicates the name of the application server group (also referred to as a pico-segment) given by the application instance and/or ADPL.

Each security profile indicates a risk to data security, and may have one of the following formats:
1. All zeros (indicates for the receiver host to continue using a security profile last received).
2. Non-zero (indicates a new security profile status in response to a change from a previously communicated security profile) and represents security risks determined on the sender host.
3. 0xFFFFFF (indicates an unknown security profile for the sender host).
4. SRC-BIT_MASK
   SRC={INVALID, EPPA, AVCD, Other} which represents the source of the security profile or the entity that provided information to form the security profile.

BIT_MASK (a mask with each bit representing the presence or absence of individual cyber attack types having predetermined values).

For the action 520 field, the field may indicate that one of several actions is to be performed by the application instance, database manager, or some other entity equipped to perform the action. The actions may include dynamic cache flush, data redaction, cache locking, memory locking, in-memory database locking, PII/PCI locking, database redaction, selective data encryption in outgoing payloads, or any other suitable security enhancing action known in the art.

In response to the action 520 field indicating a dynamic cache flush, the cache flush may be performed using any suitable existing cache flush mechanism, such as Oracle's cache flush instruction or some other suitable, built-in cache flush mechanism for the database. In another embodiment, the ADPL may force a cache flush using its own cache flush mechanism. However, instead of flushing cache using the data protection socket API, it is preferred to have application instances and individual databases, such as databases from Oracle, SAP, DB2, etc., execute their own cache flush intelligently, using existing mechanisms. Thereby, the cache remains protected and no change in the application architecture is used to implement the dynamic cache flush described herein in various embodiments.

The database applications typically have a built-in cache flush feature (referred to as "results cache flush"). However, the results cache flush is applied in a static manner to enhance the performance of the database, and not for security purposes. With the inclusion of mapping between security profiles of each socket descriptor and the cache flush policy, a new cache flush policy is created that is applied dynamically. A dynamic cache flush policy based on security risks is not possible in current database applications. With this mechanism, cache flush policies may be applied as needed when the risk rises above a desired range, dynamically, over the time. The dynamic cache flush policy may be tightened (applied more often and for more reasons) as the security profile indicates greater risk, and vice-versa.

In response to the action 520 field indicating data redaction, a data redaction policy is applied using any suitable data redaction mechanism, such as ORACLE Redaction Policy #120. Instead of defining the redaction policy in the ADPL, a redaction policy may be used that is provided by the database vendors, such as ORACLE, SAP, DB2, etc. Thereby, no change in the application architecture is used to implement this action.

Policy-based redaction is a method which causes the application, via input from the ADPL, to redact certain portions (high value fields) of one or more transmissions via a data socket on which a security profile has been indicated that is below a threshold for transmitting certain types of data. For example, names, addresses, financial information, social security numbers, etc., may be redacted from payload (s) in communications across this data socket. What portions of data are to be redacted may be based on the application's security policies, or dictated by the ADPL Moreover, a database server may apply a different redaction policy for each different database application or client at different times depending upon the security profile of that particular session at that time.

The data redaction may be performed in a number of different ways. In one embodiment, full redaction may be performed, in which columns and/or rows in a regular database or the in-memory database having one or more selected data types, e.g., the data is completely redacted and/or replaced with zeros. The replacement number or character may vary depending on the stored data type, e.g., numbers may be replaced with zero, letters may be replaced with all A's, single bit or flag data may be replaced with no symbol.

In another embodiment, partial redaction may be performed, in which some or a part of the data may be replaced. This partial redaction may be used in order to mask or hide sensitive information, such as portions of social security numbers, e.g., 123-xx-xxxx, portions of credit card account numbers, e.g., 4300-xxxx-xxxx-xxxx, etc.

According to another embodiment, regular expression analysis may be performed, in which particular, predetermined patterns are searched for in the data columns and/or rows of the regular or the in-memory database(s) to redact, such as non-repeating data that indicates data instead of labels, etc., where rows or columns in the database may contain information records of entities but no index, and the row or column data has no relation to one other.

In yet another embodiment, random redaction may be performed, in which selected fields of records from the regular or the in-memory database(s) may have random values replaced with random data before sending the data out in response to every access to the in-memory database.

Another possible redaction policy is to not perform redaction at all, thereby allowing redaction policies to be applied without actual data redaction taking place.

In response to the action 520 field indicating regular or in-memory database locking, one or more databases affected by the determined security risk is locked according to a memory locking mechanism, such as ORACLE DB lock instruction. Instead of defining the memory locking policy in the ADPL, a memory locking policy may be used that is provided by the database vendors, such as ORACLE, SAP, DB2, etc. Thereby, no change in the application architecture is used to implement this action. The memory locking mechanism involves stopping access to processor memory for all entities except as defined by the policy. This is necessary where the whole database resides in the processor memory (also called in-memory database) or part of the database is fetched into the processor memory from the database storage for query processing by the application.

Moreover, a database server may apply a different memory locking policy for each different database application or client at different times depending upon the security profile of that particular session at that time.

The ADPL protecting the socket descriptors for database applications create a mapping of security profile policies and the in-memory database locking on a per-socket descriptor basis, e.g., per-application per-session. Thereby, a database server may apply database locking, table locking, row and/or column locking, memory locking, etc., depending upon the security profile of that particular session at that time thereby avoiding memory scraping and/or database accesses by malware or unauthorized applications.

In response to the action 520 field indicating selective payload encrypting, a payload that is included in a transmission across the data socket descriptor is fully or partially encrypted using any known encryption technique. If the application payload which is being sent to the requesting client contains important PCI, PII, HIPAA, or other information fields, the payload may be considered for partial or full encryption based upon the security profile of the client session. By encrypting select fields within the payload, the malicious application entities which exist along with client applications do not have visibility to the important data in the payload. In other cases, even if the whole payload is copied by malicious applications, the important data stays encrypted and protected.

In response to the action 520 field indicating payload encryption, the recipient application of the payload may identify the encrypted parts of the payload and decrypt these parts using the agreed upon decryption methods with the sender.

The security profile range 514 may be indicated using a color scheme, in one embodiment. For example, the security profile range 514 may take on the colors of red, yellow, green, and normal. The security profile range 514 is a sum of percentages of individual risk/security parameters on a per-server per-socket descriptor basis. Some risk/security parameters may be provided by, but are not limited to being obtained from, a library mechanism executed in the ADPL that evaluates various attempted and/or foiled attacks on the application instance to provide risk assessment, an end point protection agent (EPPA), e.g., SYMANTEC, MCAFEE, KASPERSKY, etc., where the EPPA may derive the risk assessment using a signature based mechanism, behavior analysis based mechanism, neural network based mechanism, etc., along with other sources included in the application instance or provided by the user.

The total sum of percentages of risks from individual sources is categorized and ranged in various value ranges, according to one embodiment. The highest range is indicated with red or some other suitable color, the second highest range is indicated with yellow or a different suitable color, the third highest range is indicated with green or another suitable color, and no risks detected is indicated with a normal color (such as blue, white, black, etc.) or no color at all.

The choice of security policy for the individual session may be provided to the database application by an underlying protection layer by the use of various standard and/or proprietary socket APIs, such as getsockopt( ), a new extension named avcd_getsockopt( ), etc.

Based on the needs of an individual application, these APIs may be called to map, interpret, translate, etc., in order to understand the security profile of the session in association with the application type (e.g., database applications) and the active dynamic security policy, such as cache flush, data redaction, memory locking, cache locking, etc. Accordingly, the database application may apply the dynamic security policy or policies to that particular session, and at the same time, apply a different dynamic security policy or policies to other active sessions.

FIG. 6 shows an E-W policy mapping 600 according to one embodiment. The only differences between the E-W mapping 600 and the security profile policy mapping 500 shown in FIG. 5 is that the security profile range 514 field in the security profile policy mapping 500 is replaced with a base signature 602 field in the E-W mapping 600 shown in FIG. 6, and the actions and sub-actions available are modified, as indicated below.

The base signature is a first received secure source signature in an exchange over a particular session on a data socket. The recipient party in the data socket session sends a secure source signature to the originating party, and this signature is stored and becomes the baseline for all future transactions across the data socket.

The action 604 field in the E-W mapping 600 is configured to indicate and cause the following actions: allow, which indicates to allow the packet to be received and keep statistics; allow-analyze which indicates to receive the packet, keep the statistics thereof, and send the payload to be analyzed for security issues; drop, which indicates to cause the packet to be dropped, to keep statistics, and to log the drop; drop-analyze, which indicates to drop the packet, keep the statistics thereof, and send the payload to be analyzed for security issues; rate-limit, which indicates that the amount of data should be limited based on the security profile; and mirror, which indicates to copy the packet to external third party tool for inspections.

The sub-action 606 field in the E-W mapping 600 is configured to indicate and cause the following actions: log, which indicates to dump the log for the data socket for analysis; trap, which indicates to trap the packet for analysis; and event, which indicates that some further event is triggered, such as a predefined internal event of a session drop which in turn maps to a session drop event of external third party management tools.

Figure 7:
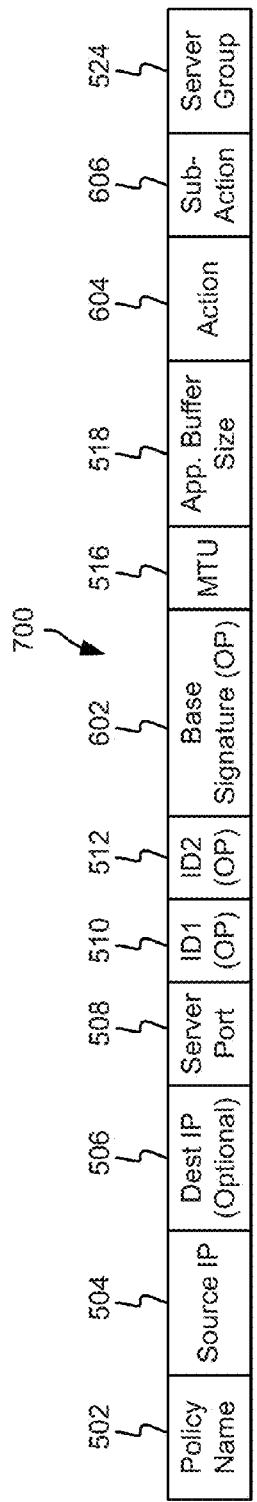
FIG. 7 shows a North-South profile policy mapping, according to one embodiment.

FIG. 7 shows a North-South (N-S) policy mapping 700 according to one embodiment. The only differences between the E-W mapping 600 of FIG. 6 and the N-S policy mapping 700 of FIG. 7 is that the ID1 510 field, the ID2 512 field, base signature 602 field are optional fields that may or may not be present in the N-S policy mapping 700, according to various embodiments. However, the actions and sub-actions available are the same for N-S policy mapping 700 as for the E-W policy mapping 600 of FIG. 6, according to this embodiment.

Figure 8:
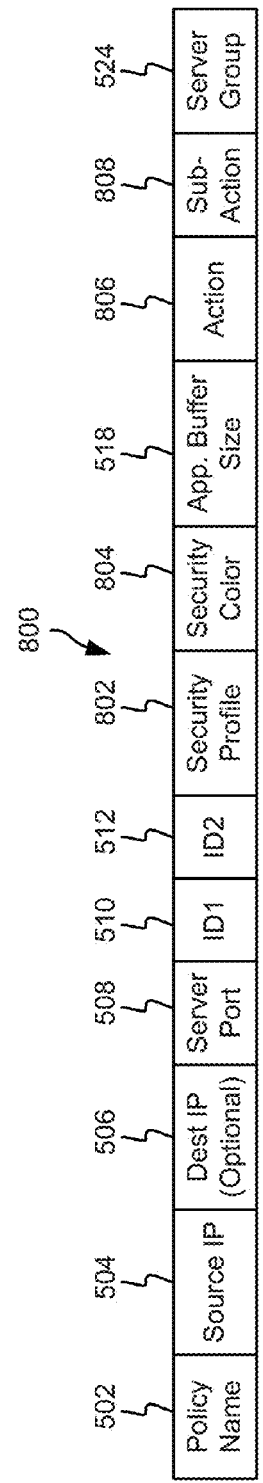
FIG. 8 shows a secure data policy mapping, according to one embodiment.

Now referring to FIG. 8, a secure data policy mapping 800 is shown according to one embodiment. The fields in the secure data policy mapping 800 are the same as for the E-W policy mapping 500 of FIG. 5, except for the following modifications. In the secure data policy mapping 800 of FIG. 8, the security profile 802 is provided, a security profile value color (Security Color) 804 field is included which indicates the color of the security profile (e.g., red, yellow, green, normal), and there is no MTU field. Moreover, the actions 806 and sub-actions 808 available are modified as follows.

The action 806 field in the secure data policy mapping 800 is configured to indicate and cause the following actions: redaction policy apply, which indicates to apply a preconfigured redaction policy on data in an in-memory database, and/or data transmitted over the data socket; cache flush, which indicates to flush the cache in response to a security profile that is considered too high risk; cache lock, which indicates to lock the cache so that only the application instance which locked the cache is able to access (read and/or write) the cache until the cache is unlocked; in-memory database lock, which indicates to lock the memory so that only the application instance which locked the memory is able to access (read and/or write) the memory until the memory is unlocked; and PII lock/PCI lock, which indicates to stop any transmissions which include PII and/or PCI to protect this data from stripping, scraping, or otherwise being obtained by an unauthorized entity.

The sub-action 808 field in the secure data policy mapping 800 is configured to indicate and cause the following actions: log, which indicates to dump the log for the data socket for analysis; trap, which indicates to trap the packet for analysis; and event, which indicates that some further event is triggered, such as a predefined internal event on session drop which in turn maps to a session drop event of external third party management tools.

In another embodiment, the security profile may not be color coded, but instead a bit may be reserved for a respective threat with the smallest indication of the presence of that threat on the server causing the bit to be flipped to indicate the presence of the threat, e.g., the bit is set to 1 (indicating the threat) from 0 (indicating no threat). A bit mask may be reserved wherein each bit indicates a different threat or threat type. The transmitting entity sets the bit as per the interpretation of the threats found by the local EPPA.

In one embodiment, data security policies may be indicated using a policy format as follows: Policy={{operands}, {actions}, [sub-actions], [params]}. The operands include, according to one embodiment: SIP, Transport Protocol, ID1, ID2, SP_SRC, and SP_Type. The operands may further include, in some embodiments, one or more of DIP and SERVER_PORT. SIP is the source IP address (e.g., sender's IP address), the DIP is the destination IP address (e.g., receiver's IP address), the SERVER_PORT is the base server port, the transport protocol is the protocol used in the transmission (e.g., TCP, UDP, Raw, etc.), SP_SRC is the source of the security policy (e.g., EPPA indicating end point protection agent, ADPL indicating application and data protection layer, or an indication of some other application, system, device, or method that is the source of the ), and SP_TYPE is the type of symptoms/attacks as provided from the security policy source.

The actions are selected from the following list: allow, drop, allow_analyze, and drop_analyze, as previously described. The sub-actions are selected from a list that includes: redaction, cache flush, memory lock, cache lock, database lock, database row lock, database column lock, and encryption. The parameter values include specific policy identification. In other embodiments, the actions may include redaction, cache flush, cache lock, memory lock, database lock, encryption, and the sub-actions may include log, event, mirror, etc.

In response to the SP_SRC being indicated as EPPA, the SP_TYPE may be selected from at least the following types of symptoms/attacks: malware presence, virus presence, rogue security software, Trojan horse, malicious spyware, computer worm, botnet, spam incidences, phishing incidence, rootkit (the tool kit used to obtain administrative privileges), outdated version of EPPA, etc.

When selecting any of these symptoms/attacks, an SP_VALUE may be set which indicates the percentage possibility value interpreted by the ADPL for specific application sensitivity.

In response to the SP_SRC being indicated as ADPL, the SP_TYPE may be selected from at least the following types of symptoms: total number of sessions allowed for the application being protected, total number of sessions rejected, total number of sessions rejected due to policies, total number of sessions rejected due to ID1 mismatch, total number of sessions rejected due to ID2 mismatch, total number of application session payloads rejected due to policies, total number of application session payloads rejected due to ID1 mismatch, total number of application session payloads rejected due to ID2 mismatch, total number of application session payloads rejected due to secure signature mismatch, total number of application session payloads allowed due to policies, total number of application session payloads allowed, total number of application session payloads bytes rejected due to policies, total number of application session payloads bytes rejected due to ID1 mismatch, total number of application session payloads bytes rejected due to ID2 mismatch, total number of application session payloads bytes rejected due to secure signature mismatch, etc.

When selecting any of these symptoms, an SP_VALUE may be set which indicates the percentage possibility value interpreted by the ADPL for specific application sensitivity.

The status from EPPA and ADPL sources of security policy are sent for each active session in one embodiment. Moreover, one ADPL tag is configured to indicate one security policy source (SP_SRC) only. Additionally, each SP_SRC may be assigned a percentage value, e.g., EPPA SRC=70%/ADPL SRC=30%, EPPA SRC=80%/ADPL SRC=20%, EPPA SRC=50%/ADPL SRC=50%, EPPA SRC=40%/ADPL SRC=60%, etc., based on the desired percentage of processing for each source type when there are numerous ADPL tags to be processed expediently. The percentage represents a number of times a security profile value from a select source is exchanged with a peer in an ADPL tag.

In various embodiments, the ADPL tag may comprise any or all of the fields described hereafter. A first ID field may be included in the ADPL tag that is configured to store a programmable, globally unique identification number that is provided on a per-entity basis (one ID for each entity that is utilizing the ADPL tagging scheme), which may be referred to as a client or company identification number (CID) in some approaches. A second ID field may be included in the ADPL tag that is configured to store a programmable, unique identification number within the entity provided the first ID, which may be referred to as an organization or department identification number (DID) in some approaches. A security profile field may be included in the ADPL tag that is configured to store a security profile value calculated for the first host. Also, a secure signature field may be included in the ADPL tag that is configured to store a secure source signature for the application payload.

In one embodiment, the secure source signature may be based, at least in part, on attributes of the sender data socket descriptor and a receiver data socket descriptor. In this embodiment, the attributes of the sender and receiver data socket descriptors may include any or all of the following information: a server and/or a source IP interface, a server or host port number, a maximum number of allowable waiting connections, an application packet buffer size for transmitting and receiving data, a port number of a transport of the sender data socket descriptor, an IP address of a receiver data socket descriptor in the second host, a port number of the transport of the receiver data socket descriptor in all cases of controlled port allocations by the first application instance, bandwidth and flow specific mathematical transforms, a maximum application packet buffer size usable for transmitting data to and receiving data from the receiver data socket descriptor, etc.

Current methods for server and end point protection include identifying threats for a local server and trying to mitigate (as best as possible) the risks associated with these identified risks at the local server. However, none of the applications running on the local server are informed of the threats. Moreover, threat profiles are not shared with any other peer servers or peer applications.

According to embodiments describe herein, the threats detected and identified are extracted, interpreted, mapped, and shared with all the local application instances, remote application instances, and remote servers (on a per-session basis). This enables local and remote application instances to take precautions in real time and provides them information and awareness to respond to infected or compromised server, application instances, and/or sessions based upon the security profiles.

Figure 9:
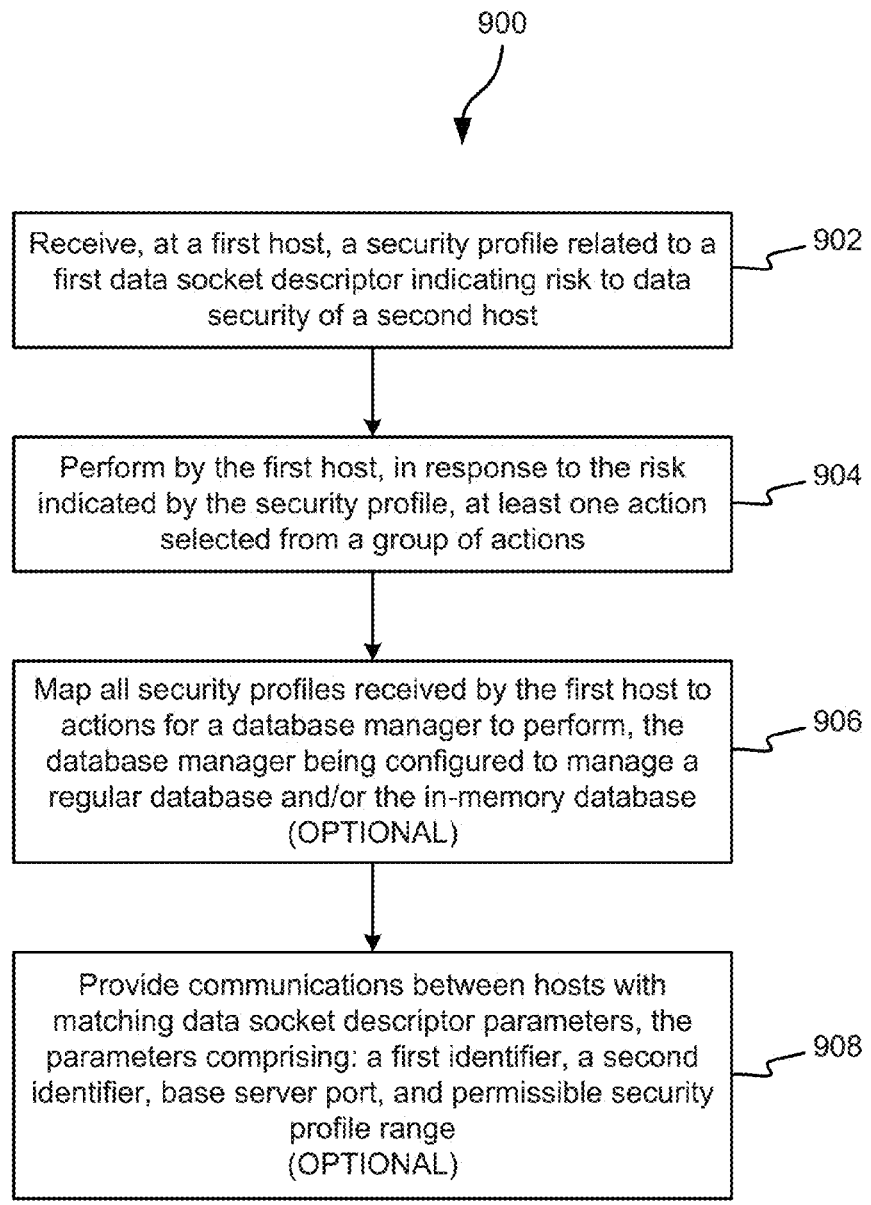
FIG. 9 shows a flowchart of a method, according to one embodiment.

Now referring to FIG. 9, a flowchart of a method 900 is shown according to one embodiment. The method 900 may be performed in accordance with the present invention in any of the environments depicted in FIGS. 1-8, among others, in various embodiments. Of course, more or less operations than those specifically described in FIG. 9 may be included in method 900, as would be apparent to one of skill in the art upon reading the present descriptions.

Each of the steps of the method 900 may be performed by any suitable component of the operating environment. For example, in various embodiments, the method 900 may be partially or entirely performed by a server, host, computing system, processor, switch, or some other device having one or more processing units therein. The processing unit, e.g., processing circuit(s), chip(s), and/or module(s) implemented in hardware and/or software, and preferably having at least one hardware component, may be utilized in any device to perform one or more steps of the method 900. Illustrative processing units include, but are not limited to, a central processing unit (CPU), an ASIC, a FPGA, etc., combinations thereof, or any other suitable computing device known in the art.

As shown in FIG. 9, method 900 may initiate with operation 902, where a security profile indicating risk to data security specific to a data socket descriptor of the first host is received at a first host.

The security profile may include a value selected from a group of values. The group of values include: all zeros indicating to continue using a previously received security profile, a non-zero value indicating a new security profile status in response to a change from a previously communicated security profile, and 0xFFFFFF indicating an unknown security profile.

In operation 904, at least one action is performed by the first host in response to the risk indicated by the security profile. The at least one action is selected from a group of actions that include a cache flush on a cache of the first host according to a cache flush policy. The group of actions also includes cache locking on first data stored in the cache of the first host according to a cache locking policy, and data redaction on second data stored in a database which includes an in-memory database of the first host according to a redaction policy. Moreover, the group of actions includes memory locking of third data stored in the database of the first host according to a memory locking policy, and encryption of fourth data stored in the regular or in-memory database of the first host.

According to one embodiment, the at least one action may be performed dynamically on a per-session basis contingent upon the security profile of a particular session and the risk indicated by the security profile of the particular session.

In a further embodiment, a different action may be applied for each different database application at different times depending upon a security profile of a particular session at the different time.

The method 900 may also include, in optional operation 906, mapping all security profiles received by the first host to actions for a database manager to perform. The database manager is configured to manage the in-memory database. The mapping may include any useful values, such as those described in FIGS. 5-8, according to various embodiments.

In one embodiment, the fourth data stored in the in-memory database of the first host that is encrypted may include PII and/or PCI data, or any other sensitive information stored to the in-memory database.

Method 900 may also include, in optional operation 908, providing communications between hosts with matching data socket descriptor parameters, the parameters comprising: a first identifier, a second identifier, base server port, and permissible security profile range.

Method 900 may be implemented as a system, process, or a computer program product. As a system, method 900 may be implemented on the first host and/or the second host as logic configured to perform method 900, along with being implemented on any other hosts on which secure communications are desired. As a computer program product, a computer readable storage medium may store program instructions configured to perform method 900.

For example, a system may include a processing circuit and logic integrated with and/or executable by the processing circuit. The processing circuit is a non-transitory hardware device configured to execute logic embedded therein, or provided thereto. Examples of processing circuits include, but are not limited to, CPUs, ASICs, FPGAs, microprocessors, integrated circuits, etc. The logic is configured to cause the processing circuit to receive, at a first host, a security profile indicating risk to data security specific to a data socket descriptor of the first host, and perform, by the first host, at least one action selected from a group of actions in response to the risk indicated by the security profile. The group of actions comprises: a cache flush on a cache of the first host according to a cache flush policy, cache locking on first data stored in the cache of the first host according to a cache locking policy, data redaction on second data stored in an in-memory database of the first host according to a redaction policy, memory locking of third data stored in the in-memory database of the first host according to a memory locking policy, and encryption of fourth data stored in the in-memory database of the first host.

In another example, a computer program product may include a computer readable storage medium having program instructions stored thereon. The computer readable storage medium is a non-transitory device configured to store program instructions that are executable and/or readable by a processing circuit. The program instructions are executable by a processing circuit to cause the processing circuit to perform method 900 as follows: receiving, at a first host, a security profile indicating risk to data security specific to a data socket descriptor of the first host, and performing, by the first host, at least one action selected from a group of actions in response to the risk indicated by the security profile. The group of actions comprises: a cache flush on a cache of the first host according to a cache flush policy, cache locking on first data stored in the cache of the first host according to a cache locking policy, data redaction on second data stored in an in-memory database of the first host according to a redaction policy, memory locking of third data stored in the in-memory database of the first host according to a memory locking policy, and encryption of fourth data stored in the in-memory database of the first host.

In one embodiment, an action may be performed based on security profiling and alerts corresponding to an application or application instance operating in a data center. The action is performed dynamically on a per-session basis depending upon the security profile of that particular session and may be any of the following: cache flush, cache lock, memory lock, data redaction, and selective data encryption.

In another embodiment, action instructions may be mapped to the security profiles of the server on which the database and/or application is operating, the security profile of the peer of the socket descriptor (session), etc.

According to another embodiment, one or more APIs may be provided to the application through which the application may access the security profile of the session it is serving and also understand recommended action(s) suggested for that particular session (e.g., data socket descriptor).

In yet another embodiment, the application or application instance may be provided the ability to dynamically perform at least one action on a per-session basis instead of statically applying the action to all sessions.

In one embodiment, communication is allowed between servers with the same ID1, ID2, base server port, and allowed security profile range. By adding a policy to each data socket descriptor, certain behavior is enforced and/or application security and data security is assured.

Moreover, in another embodiment, library and library functions may be compiled with the application or application instance statically or attached dynamically to enforce communication flows, application behavior, and security at the data socket descriptor level.

Variations of the systems, methods, and computer program products described herein are also possible, and the explicit description thereof in this document is not required in order to provide those of skill in the art with the ability to conceive of such variations when reading the present descriptions.

What is claimed is:

1. A method, comprising:
  receiving, at a first host, a security profile related to a first data socket descriptor indicating risk to data security of a second host; and
  in response to the risk indicated by the security profile, performing, by the first host, at least one action selected from a group of actions comprising:
    a cache flush on a cache of the first host according to a cache flush policy;
    cache locking on first data stored in the cache of the first host according to a cache locking policy;
    data redaction on second data of a first payload prior to being sent by the first host according to a redaction policy;
    memory locking of third data stored in an in-memory database of the first host according to a memory locking policy; and
    encryption of fourth data stored in the in-memory database of the first host or encryption of selected data fields of a second payload prior to being sent from the first host.

2. The method as recited in claim 1, wherein the security profile includes a value selected from a group of values comprising:
  all zeros indicating to continue using a previously received security profile;
  a non-zero value indicating a new security profile status in response to a change from a previously communicated security profile; and
  all ones indicating an unknown security profile.

3. The method as recited in claim 1, wherein the at least one action is performed dynamically on a per-session basis contingent upon the risk indicated by the security profile of the second host.

4. The method as recited in claim 3, wherein a different action is applied for each different database application at different times depending upon a security profile of a particular session at the different time.

5. The method as recited in claim 1, further comprising mapping all security profiles received by the first host from the second host to actions for a database manager to perform, the database manager being configured to manage a regular database and/or the in-memory database.

6. The method as recited in claim 1, wherein the fourth data stored in the in-memory database of the first host that is encrypted or the selected data fields of the payload to encrypted is selected from a group comprising:
  Personally Identifiable Information (PII),
  Payment Card Industry (PCI) data,
  Health Insurance Portability and Accountability Act (HIPAA) sensitive data, and
  business-critical data.

7. The method as recited in claim 1, further comprising providing communications between hosts with matching data socket descriptor parameters, the parameters comprising: a first identifier, a second identifier, base server port, and permissible security profile range.

8. A system, comprising:
  a processing circuit and logic integrated with and/or executable by the processing circuit, the logic being configured to cause the processing circuit to:
    receive, at a first host, a security profile related to a first data socket descriptor indicating risk to data security of a second host; and
    perform, by the first host, at least one action selected from a group of actions in response to the risk indicated by the security profile, the group of actions comprising:
      a cache flush on a cache of the first host according to a cache flush policy;
      cache locking on first data stored in the cache of the first host according to a cache locking policy;
      data redaction on second data of a first payload prior to being sent by the first host according to a redaction policy;
      memory locking of third data stored in an in-memory database of the first host according to a memory locking policy; and
      encryption of fourth data stored in the in-memory database of the first host or encryption of selected data fields of a second payload prior to being sent from the first host.

9. The system as recited in claim 8, wherein the security profile includes a value selected from a group of values comprising:
  all zeros indicating to continue using a previously received security profile;
  a non-zero value indicating a new security profile status in response to a change from a previously communicated security profile; and
  all ones indicating an unknown security profile.

10. The system as recited in claim 8, wherein the at least one action is performed dynamically on a per-session basis contingent upon the risk indicated by the security profile of the second host.

11. The system as recited in claim 10, wherein a different action is applied for each different database application at different times depending upon a security profile of a particular session at the different time.

12. The system as recited in claim 8, wherein the logic is further configured to cause the processing circuit to map all security profiles received by the first host to actions for a database manager to perform, the database manager being configured to manage a regular database and/or the in-memory database.

13. The system as recited in claim 8, wherein the fourth data stored in the in-memory database of the first host that is encrypted or the selected data fields of the payload to be encrypted is selected from a group comprising:
Personally Identifiable Information (PII),
Payment Card industry (PCI) data,
Health Insurance Portability and Accountability Act (HIPAA) sensitive data, and
business-critical data.

14. The system as recited in claim 8, wherein the logic is further configured to cause the processing circuit to provide communications between hosts with matching data socket descriptor parameters, the parameters comprising: a first identifier, a second identifier, base server port, and permissible security profile range.

15. A computer program product, comprising a computer readable storage medium having program instructions stored thereon, the program instructions being executable by a processing circuit to cause the processing circuit to:
receive, at a first host, a security profile related to a first data socket descriptor indicating risk to data security of a second host; and
perform, by the first host, at least one action selected from a group of actions in response to the risk indicated by the security profile, the group of actions comprising:
a cache flush on a cache of the first host according to a cache flush policy;
cache locking on first data stored in the cache of the first host according to a cache locking policy;
data redaction on second data of a first payload prior to being sent by the first host according to a redaction policy;
memory locking of third data stored in an in-memory database of the first host according to a memory locking policy; and
encryption of fourth data stored in the in-memory database of the first host or encryption of selected data fields of a second payload prior to being sent from the first host.

16. The computer program product as recited in claim 15, wherein the security profile includes a value selected from a group of values comprising:
all zeros indicating to continue using a previously received security profile;
a non-zero value indicating a new security profile status in response to a change from a previously communicated security profile; and
all ones indicating an unknown security profile.

17. The computer program product as recited in claim 15, wherein the at least one action is performed dynamically on a per-session basis contingent upon the risk indicated by the security profile of the second host, and wherein a different action is applied for each different database application at different times depending upon a security profile of a particular session at the different time.

18. The computer program product as recited in claim 15, wherein the program instructions further cause the processing circuit to map all security profiles received by the first host from the second host to actions for a database manager to perform, the database manager being configured to manage a regular database and/or the in-memory database.

19. The computer program product as recited in claim 15, wherein the fourth data stored in the in-memory database of the first host that is encrypted or the selected data fields of the payload sent from the first host that is encrypted is selected from a group comprising:
Personally Identifiable Information (PII),
Payment Card Industry (PCI) data,
Health Insurance Portability and Accountability Act (HIPAA) sensitive data, and
business-critical data.

20. The computer program product as recited in claim 15, wherein the program instructions further cause the processing circuit to provide communications between hosts with matching data socket descriptor parameters, the parameters comprising: a first identifier, a second identifier, base server port, and permissible security profile range.

* * * * *